Nov. 27, 1934.  C. E. WILLIAMS ET AL  1,982,490
CELLULAR CLAY INSULATION FOR METALLURGICAL APPARATUS
Filed July 29, 1932
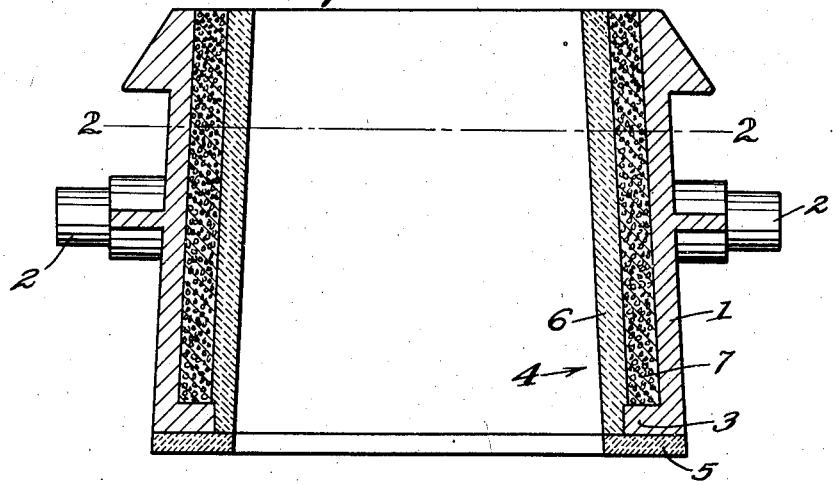
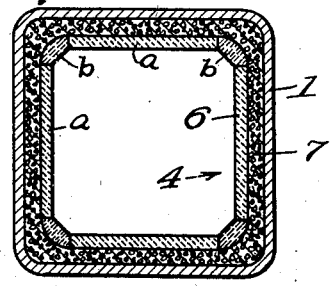
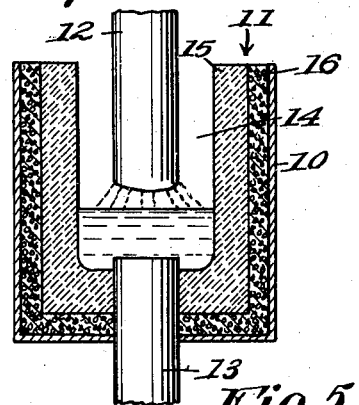
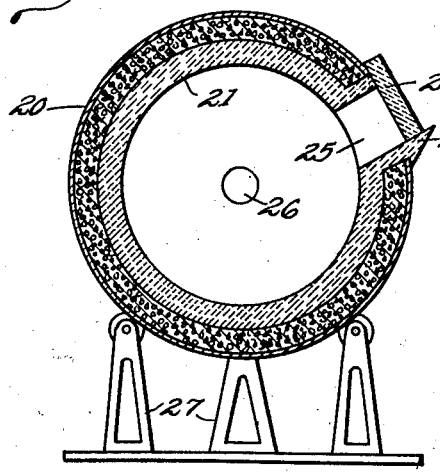
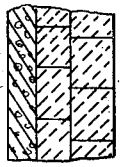
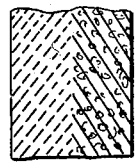
Inventors
C. E. Williams
J. D. Sullivan
By W. S. McDowell
Attorney Patented Nov. 27, 1934

1,982,490

UNITED STATES PATENT OFFICE 1,982,490

CELLULAR CLAY INSULATION FOR METALLURGICAL APPARATUS

Clyde E. Williams and John D. Sullivan, Columbus, Ohio, assignors to Battelle Memorial Institute, Columbus, Ohio, a corporation of Ohio Application July 29, 1932, Serial No. 626,172

8 Claims. (Cl. 266—43)

This invention relates to an improved ceramic insulation which has been especially developed for use in the walls of metallurgical apparatus for reducing heat losses through such walls and to improve the efficiency and life of wall members employed in high temperature zones, such as those in which molten metals, slags or glasses are present.

It is another object of the invention to provide an improved heat insulating lining for use in apparatus handling molten metals and wherein the lining is laminated and comprises a relatively dense body of refractory with which is joined one or more layers of a light weight, bloated cellular ceramic material, like clay, the latter being integrally bonded or fused with the dense layer, whereby the composite lining, when used in metallurgical apparatus will possess improved heat insulating properties, high resistance to destruction in response to temperatures and deleterious chemical effects incident to contact with molten metals and will afford a high degree of protection to the outer walls, settings or casings found in connection with apparatus used in handling or treating molten metals.

A further object of the invention resides in a lining for metallurgical apparatus composed of a highly cellular layer of fired clay applied and bonded to a surface of a fired clay body having a greater density than the cellular layer, the construction being such that the cellular layer may be applied on the desired surface of the dense clay body before or after the lining has been fired in order that a desired bond may be formed between the dense clay and the cellular clay units which will render the material particularly suitable as a lining or insulation in metallurgical apparatus.

For a further understanding of the invention, reference is to be had to the following description and the accompanying drawing, wherein:

Fig. 1 is a vertical sectional view taken through an ingot mold hot top and disclosing the use of the lining comprising the present invention therein;

Fig. 2 is a horizontal sectional view on the line 2—2 of Fig. 1;

Fig. 3 is a diagrammatic sectional view taken through an electric melting furnace and disclosing the lining comprising the present invention therein;

Fig. 4 is a similar view through a modified form of an electric furnace equipped with our improved lining.

Fig. 5 is a detail vertical sectional view taken through a lining wherein the cellular material is an integral part of the brick;

Fig. 6 is a similar view wherein is disclosed joined, separate layers of the cellular material and the dense brick-like material.

In metallurgical apparatus, there are many places where our improved cellular clay insulation may be advantageously utilized. For instance, as shown in Figs. 1 and 2 in the manufacture of removable tops for ingot molds, known to the art as hot tops. A hot top is a hollow body of suitable refractory quality that is set over an ingot mold to contain a volume of molten metal, and insulates the upper part of the ingot to delay cooling, thereby maintaining a mass of molten metal for a time at the top of the ingot. This molten metal descends to fill the cavity which is otherwise produced in the center of the ingot during cooling. The use of a hot top eliminates the so-called pipes and thus results in minimizing the amount of metal lost as waste or scrap from an ingot. At this juncture, reference is made to United States Patents Nos. 1,804,204; 1,804,205; 1,804,206; 1,804,207 and 1,804,208, issued to W. M. Charman and H. J. Darlington which disclose improved hot tops of the type to which reference has been made. In certain respects, the present invention provides an improved lining for the construction set forth in the Charman Patent No. 1,804,205.

The following discussion will serve to distinguish the Charman type of hot top from others in common use. A common type of hot top consists of a refractory made of clay or various mixtures, such as sawdust, shavings, charcoal, paper pulp, wood pulp, coke, straw, hay, corn cobs, or other vegetable fiber mixed with a refractory binder. Such a top is set over an ingot mold and, after the molten material is poured into the ingot and solidification takes place, the hot top is broken away and discarded. That type of hot top is intended merely for a single use, whereas the hot tops disclosed in the Charman patent supra may be used repeatedly.

Such a hot top is illustrated in Figs. 1 and 2 and comprises a metallic shell or casting 1, from which project horizontal, axially aligned trunnions 2, for convenience in handling. The bottom of the casting or shell 1 is provided with an inwardly directed flange 3 which provides a base for the improved ceramic lining 4, comprising the present invention. The bottom of the flange 3 is provided with a refractory ring 5 for engagement with the ingot mold. By reference to Figs. 1 and 2, it will be observed that the lining comprises sections, each of which is formed to include an inner dense clay body 6 and an adjoining cellular clay body 7, the cellular clay body being positioned between the dense clay body 6 and the metallic casing or shell 1. Our invention resides chiefly in associating the cellular clay body with the dense clay body. The cellular clay body or brick is highly refractory, but owing to its porosity or cellularity is a better heat insulator than compact brick of the same composition. Since the cellular clay body is porous, it should not come in contact with molten metal and therefore is positioned adjacent to the casing 1, while that part of the refractory coming in contact with the molten metal, as at 6, is of dense, compact composition. Our improved refractory therefore comprises a unit wherein one-half is solid and compact and the other half cellular, however, it will be understood that the relative thicknesses of the bodies 6 and 7 may be varied in accordance with conditions or service to which the material is placed. For instance, the refractory might be one-third cellular and two-thirds solid, or vice versa, or some other suitable ratio. Again, it is within the scope of the invention to form the refractory so that the cellular body 7 may be entirely separate and not joined with the dense body 6. Thus the cellular portion might be used much longer than the solid portion, permitting the solid portion, after erosion, to be replaced with a new body. Again, the refractory need not necessarily be made of clay or fire brick, since other inert refractory materials of basic, acid or neutral composition, capable of being bloated to produce cellularity and highly resistant to destruction under high temperatures, may be used and for this reason use is made of the term refractory material in the following claims.

As shown in Fig. 2, the casing 1 is of substantially rectangular cross sectional configuration and to adapt the lining to the shape thereof, the said lining comprises a plurality of side sections, which are indicated at $a$ and between which are located corner sections $b$, all of the sections $a$ and $b$, however, being formed to include the dense body 6 and the cellular body 7.

The cellular body is preferably produced in a thin fluid-like clay mixture by the interaction of a dilute acid and a carbonate, with the result that a gas is liberated which readily permeates throughout the mass of fluid clay mixture immediately prior to its setting. To the clay mixture may be added a sufficient amount of gypsum to control the rate of setting and the size of the cell or pore openings. Similar results can be obtained by bloating calcined gypsum or plaster of Paris and concrete. As an alternative method of producing a cellular inert material for use as a heat insulator and refractory, the porosity or cellularity may be obtained by the addition of a foaming agent to the mixture when the latter is in a fluid state. Since these processes of producing porous or cellular ceramic materials are well understood by those skilled in the art, a more detailed explanation with respect thereto has been considered unnecessary.

We have described our material as being particularly useful in the manufacture of hot tops, but it will be understood that this is but one use thereof in connection with metallurgical apparatus generally. For instance, the insulation may be employed to considerable advantage in the construction of electric melting furnaces, which latter have many uses in the metallurgical industry in the melting of metals and alloys. Steels, including alloy steels, can be readily melted in an electric furnace. Other alloys such as brass or bronze are likewise melted in such furnaces as are also refractories of the so-called mullite type.

Melting is effected by the heat from an electric arc or arcs and because of the high temperature of the arc, the furnace must be lined with a very refractory material. Since high temperatures are employed in such furnaces, the heat loss through the walls thereof is also high, and it is one of the primary purposes of the present invention to provide an improved lining for such a furnace, wherein, through the use of the cellular material, heat losses are materially reduced.

In Fig. 3 there is illustrated the direct-heating arc type of furnace in which the numeral 10 represents the metallic shell of the furnace, and the numeral 11 the improved lining of refractory material comprising the present invention. A movable carbon electrode 12 is attached to a suitable source of electrical supply, while the stationary carbon electrode 13 is likewise attached to a suitable source of electric current, and forms a part of the bottom of the furnace, the current passing from the electrode 12, thence through the bath of molten metal in the melting chamber 14 of the furnace, through the electrode 13 and thence to the source of current supply, the heat of the arc formed between said electrodes being utilized to melt the metals in the chamber 14. Alternating or direct current can be used in such a furnace. The lining 11 includes the dense clay layers 15 and the cellular layers 16, the latter being interposed between the dense layers 15 and the metal walls of the shell 10.

In Fig. 4, a different type of electric furnace has been set forth following the general construction described in United States Patent No. 1,201,225 issued to H. W. Gillett. In Fig. 4, the numeral 20 designates the metallic shell of an electrical furnace. 21 represents the refractory lining made in accordance with the present invention, the numeral 22 designates the pouring lip of the furnace; 24 a door or stopper to close the charging or discharging opening 25 and the numeral 26 designates one of the carbon electrodes. The shell is of circular form and is supported upon a rotor frame 27. It will be understood that in any furnace of this type, a layer of the material being melted is likely to build on the refractory lining. As a specific example, in melting mullite in this type of furnace, the latter eventually is lined with mullite. By the use of our improved composite lining in this type of furnace, not only is better heat insulation afforded through the use of the cellular material but also the dense clay refractory lining of the melting chamber may be removed upon the accumulation of adhering matter or other deterioration thereof and a new refractory substituted.

Our invention is likewise applicable to the linings of soaking-pit furnaces, heat treating, annealing and normalizing furnaces and to the linings of reverberatory furnaces. In such installations, the use of the cellular insulation minimizes heat losses and provides for less expense in furnace maintenance. Brick in which the cellular material is an integral part of the brick can be used, as shown at 30 in Fig. 5, or, when desired, joined but separate layers of the cellular material and the dense brick-like material used, as indicated at 31 in Fig. 6. In any event, cellular brick should not be used next to the molten charge but should be protected by the intervening dense clay layer.

By placing the dense lining in its proper position in the furnace and pouring or tamping back of it a cement containing gas-forming constituents which will evolve gas, on the setting of the cement itself, the formation of the cellular ceramic can be accomplished in situ. Suitable additions to Portland, aluminous, or other hydraulic cement of gas-forming materials, and, if desired, of refractory grog, produce cementitious mixtures that will set in cellular form, adhering to the dense lining and forming a monolithic backing for it.

What is claimed is:

1. A ceramic or refractory unit for lining metallurgical apparatus comprising a refractory material of relatively high density and a light weight cellular layer inseparably united with one of the surfaces of said body portion, the relative thicknesses of the dense and cellular bodies to be varied in accordance with conditions or service to which the material is placed, said cellular material being of substantially uniform composition throughout and characterized by the inclusion throughout its body of separate and closed cells separated by thin cell walls of refractory material.

2. As a new article of manufacture, a refractory lining unit of the acid type for metallurgical apparatus comprising a body portion of relatively high density, and a heat insulating portion composed of a cellular argillaceous material inseparably united with said body portion, said cellular material comprising a heat-treated argillaceous body of substantially uniform composition throughout and of predetermined shape and dimensions, and characterized by the inclusion throughout its body of separate and closed cells separated by relatively thin cell walls of fired-clay material having in its unit form a density of less than one-half the density of the first-named body portion of said unit.

3. A ceramic or refractory unit for lining metallurgical apparatus comprising a refractory material of relatively high density and a light weight cellular layer inseparably united with one of the surfaces of said refractory material of high density, the relative thickness of the dense and cellular materials being in accordance with conditions of service to which the unit is placed, said cellular material being of substantially uniform composition throughout and characterized by the inclusion throughout its body of separate and closed cells separated by thin cell walls of refractory material.

4. The method of lining the shell of a metallurgical unit which comprises placing a layer of dense refractory therein and spaced from the shell, placing between said dense refractory layer and said shell a potential refractory material which contains a gas forming constituent, and causing gas to be evolved in situ in said material to form a cellular backing integral with and adhering to said dense refractory.

5. A lining for metallurgical apparatus comprising a refractory material of relatively high density and an integrally attached adjoining layer of heat-insulating refractory material, said heat-insulating material being of substantially uniform composition and characterized by inclusion throughout its body of separate cells separated by thin walls of refractory material.

6. As a new article of manufacture, a refractory lining unit of the basic type for metallurgical apparatus comprising a body portion of relatively high density, and a heat insulating portion composed of a cellular material inseparably united with said body portion, said cellular material comprising a body of substantially uniform composition throughout and of predetermined shape and dimensions, and characterized by the inclusion throughout its body of separate and closed cells separated by relatively thin cell walls of material having in its unit form a density of less than one-half the density of the first-named body portion of said unit.

7. As a new article of manufacture, a refractory lining unit of the neutral type for metallurgical apparatus comprising a body portion of relatively high density, and a heat insulating portion composed of a cellular material inseparably united with said body portion, said cellular material comprising a body of substantially uniform composition throughout and of predetermined shape and dimensions, and characterized by the inclusion throughout its body of separate and closed cells separated by relatively thin cell walls of material having in its unit form a density of less than one-half the density of the first-named body portion of said unit.

8. The method of making a refractory unit for lining and insulating metallurgical apparatus which comprises applying to a refractory material of relatively high density, a mobile layer of a potential refractory material characterized by inclusion throughout its mass of cells separated by thin walls of potential refractory material, causing the said cellular material to become fixed as a rigid mass, and forming a cellular layer integral with and adhering to said dense refractory.

CLYDE E. WILLIAMS.
JOHN D. SULLIVAN.